Sept. 18, 1962 V. S. PENOTE ET AL 3,054,199
EXCAVATING MACHINE
Filed March 7, 1961 12 Sheets-Sheet 1

INVENTORS
VINCENT S. PENOTE AND
HENRY L. MEYER
BY
Teare & Fetzer
ATTORNEYS

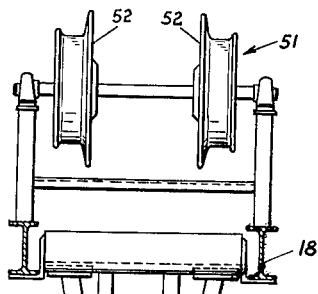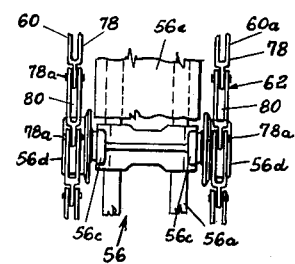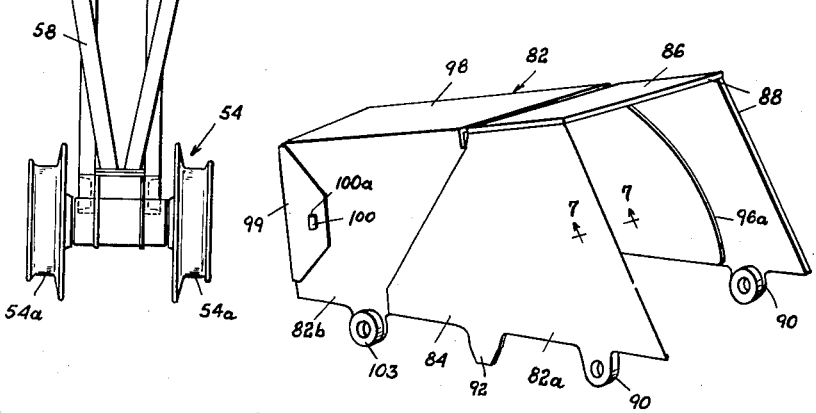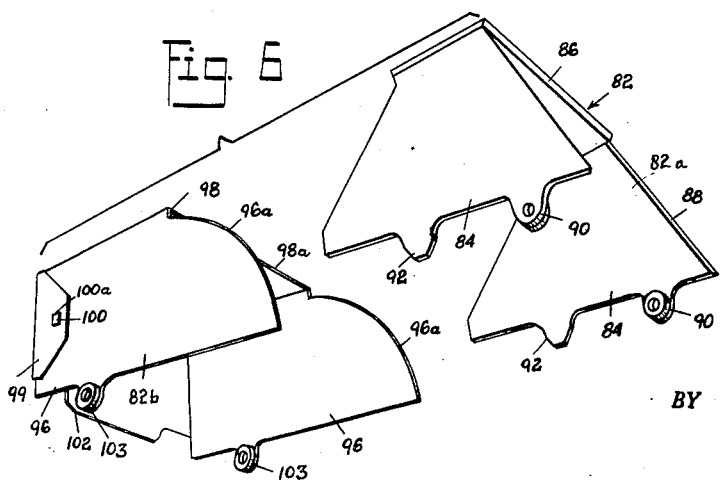

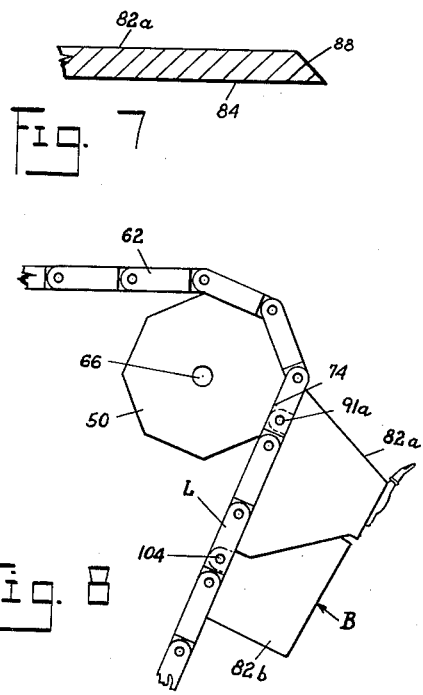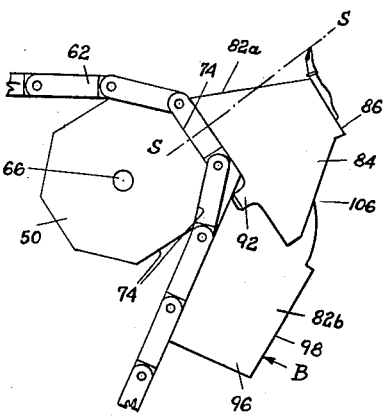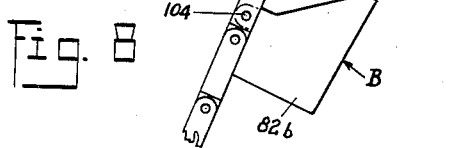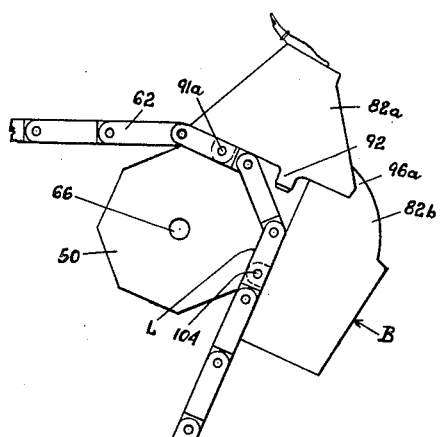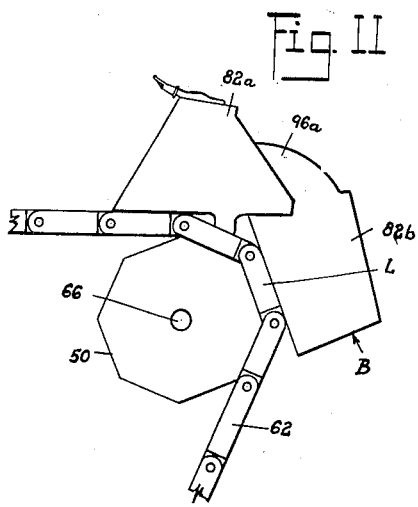

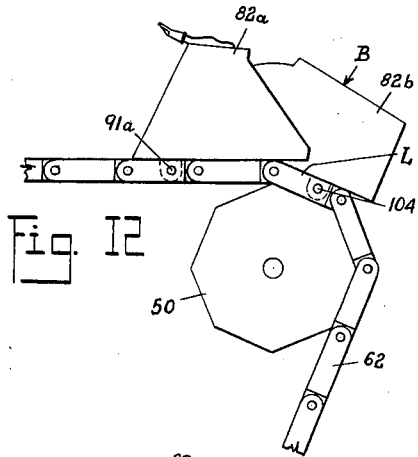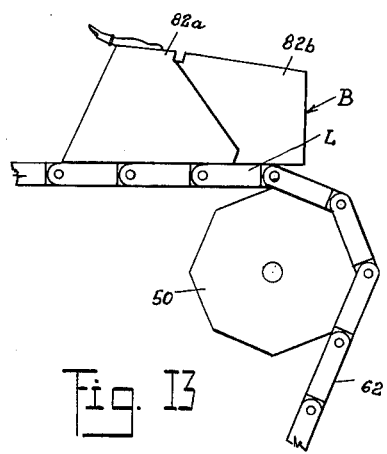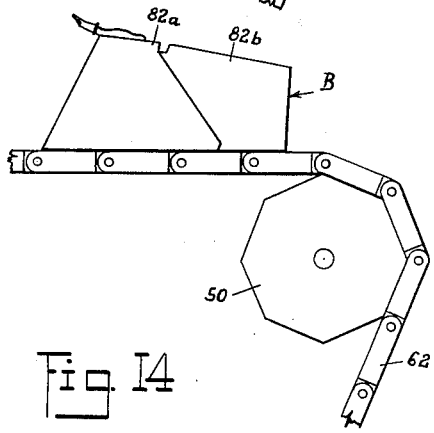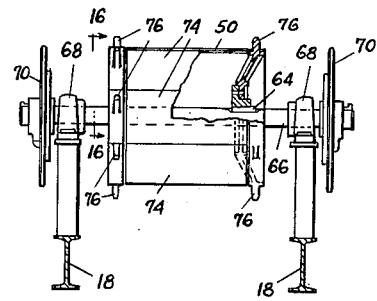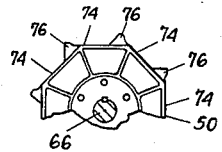
INVENTORS
VINCENT S. PENOTE AND
HENRY L. MEYER
BY
Teare & Felzer
ATTORNEYS Sept. 18, 1962 V. S. PENOTE ET AL 3,054,199
EXCAVATING MACHINE
Filed March 7, 1961 12 Sheets-Sheet 6

INVENTORS
VINCENT S. PENOTE AND
HENRY L. MEYER
BY
Teare & Fetzer
ATTORNEYS

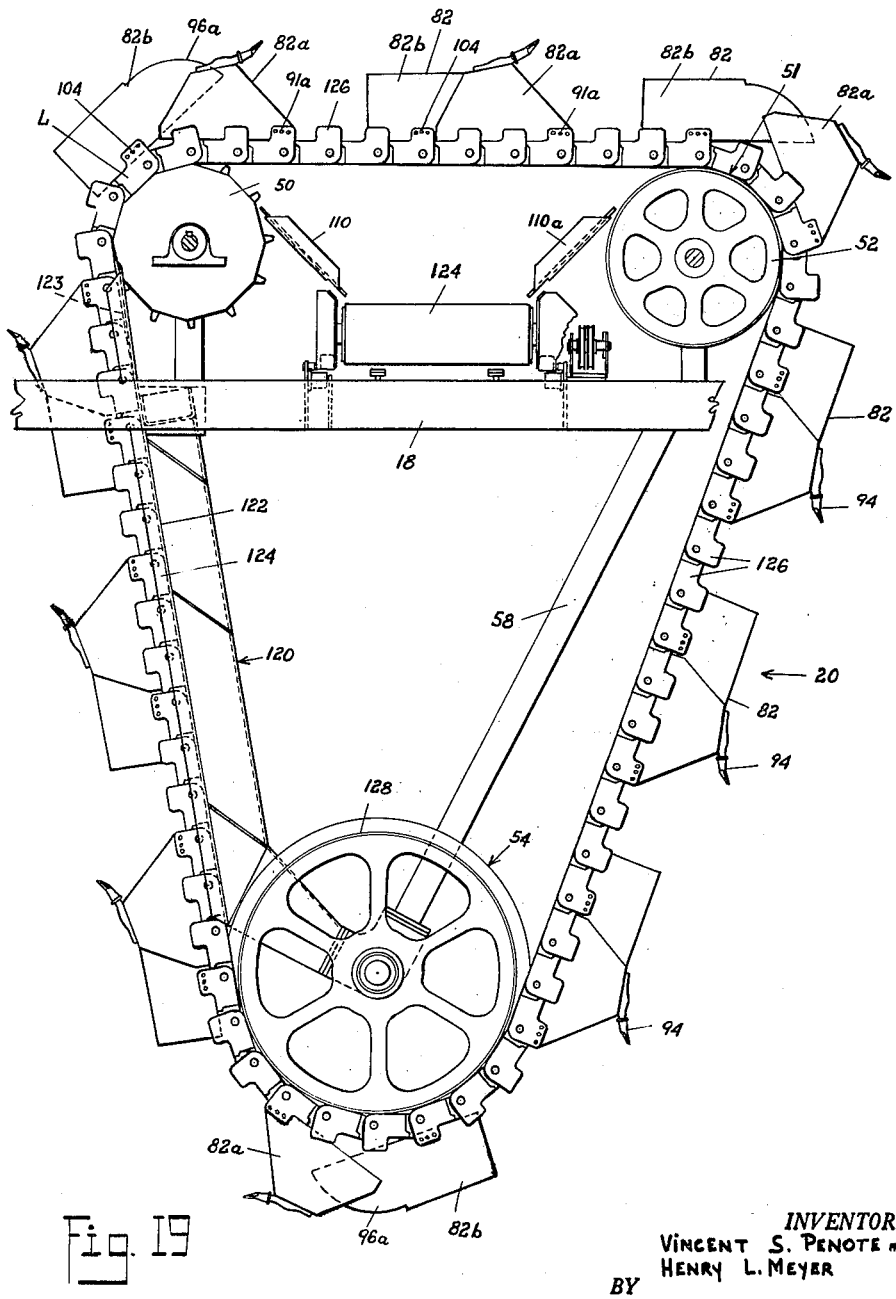

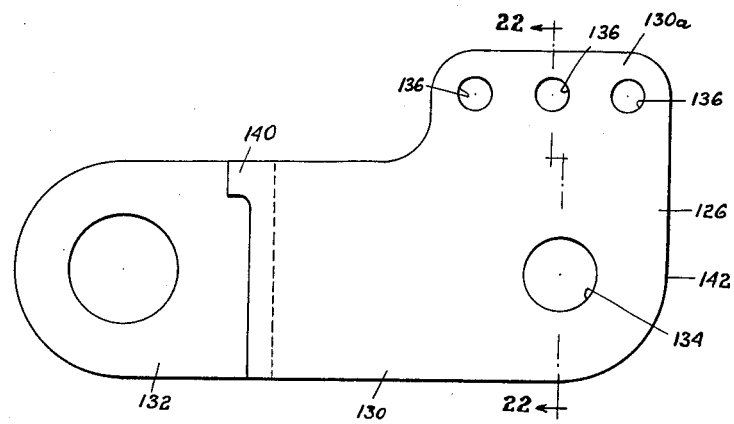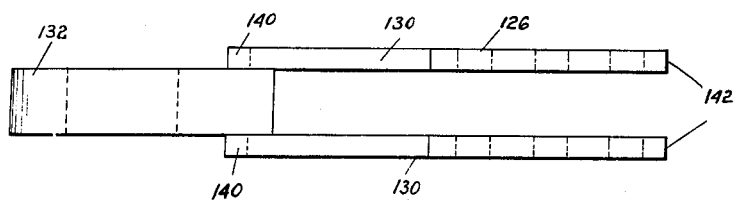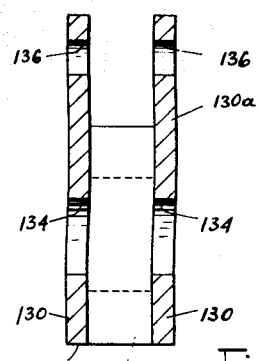

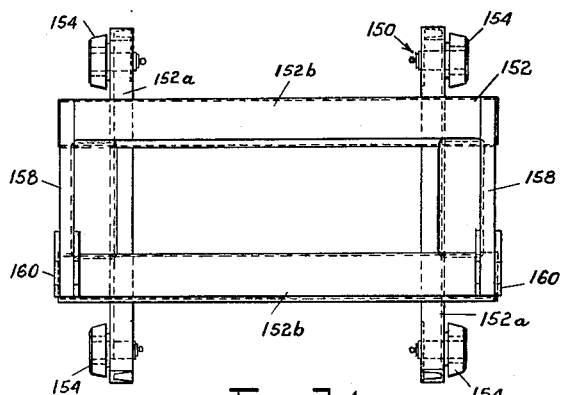
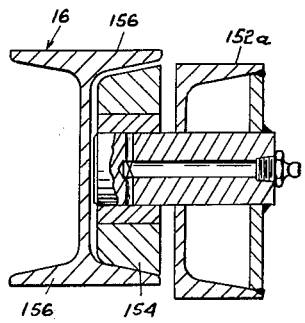
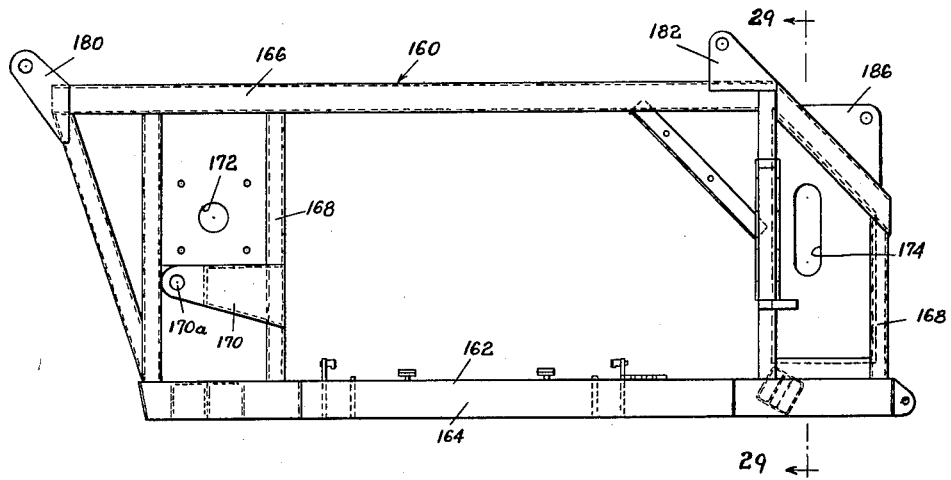

INVENTORS
VINCENT S. PENOTE AND
HENRY L. MEYER
BY
Teare & Felzer
ATTORNEYS

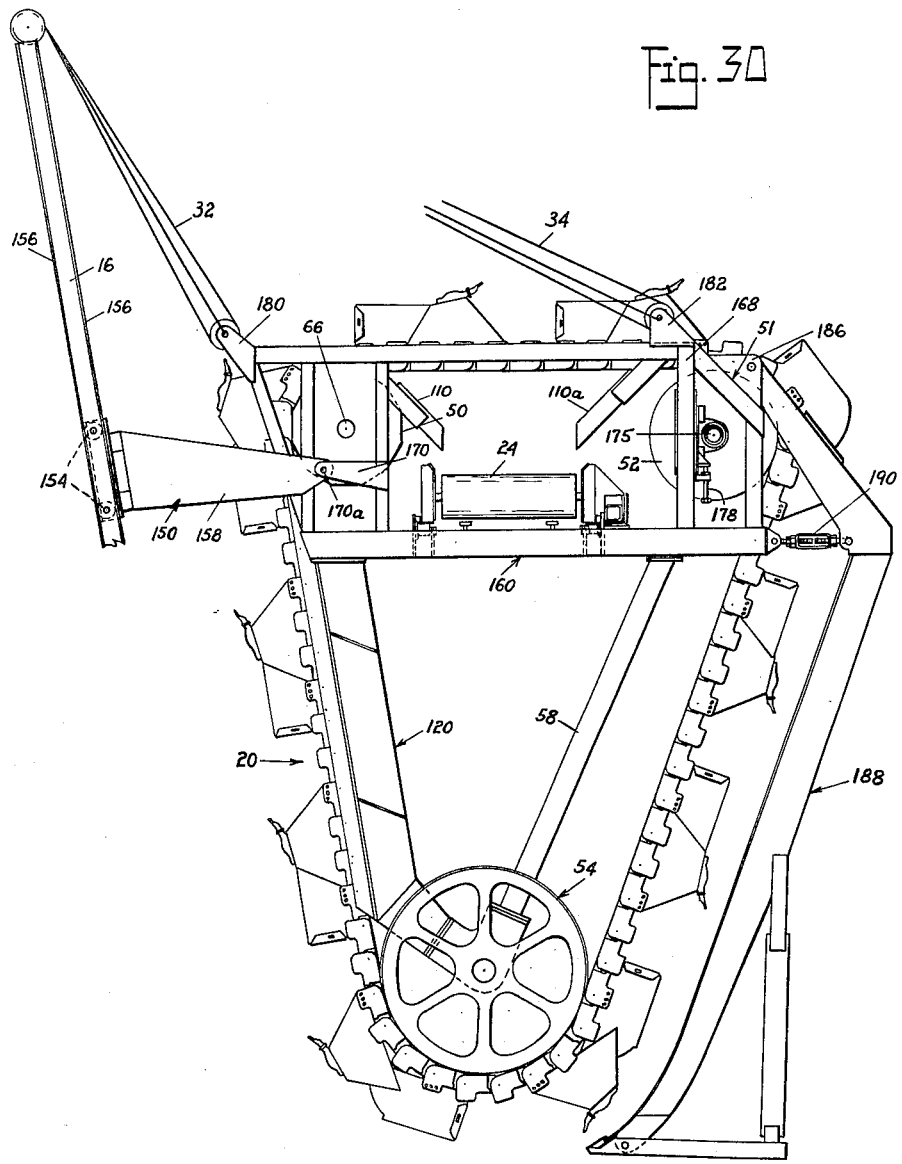

United States Patent Office 3,054,199
Patented Sept. 18, 1962

3,054,199
EXCAVATING MACHINE
Vincent S. Penote, Shaker Heights, and Henry L. Meyer, Cleveland Heights, Ohio, assignors to The Cleveland Trencher Company, Cleveland, Ohio, a corporation of Ohio
Filed Mar. 7, 1961, Ser. No. 94,025
17 Claims. (Cl. 37—90)

This invention relates in general to excavating machines and more particularly to a mobile excavating machine having a novel continuous or endless digging unit mounted thereon, and adapted for excavating trenches and the like.

Excavating machines of the type with which this invention is concerned generally comprise a mobile frame which supports a power unit on one end, and a boom mounted digging unit on the other end, with the digging unit and associated boom being adjustable in a generally vertical plane to provide for varying the depth of the excavation. The digging unit and associated boom of an excavating machine of the prior art type has generally projected a considerable distance from the respective end of the machine chassis due to the structural arrangement of the digging unit, and the power unit on the other end of the machine chassis has usually been so positioned to attempt to provide a counterbalancing force, in order to provide a generally balanced machine. Such an arrangement results in a machine of considerable length, thereby increasing the maneuverability and transporting problems of the machine.

Accordingly, an object of the present invention is to provide an excavating machine having a novel digging unit thereon which provides for a generally balanced machine of reduced length.

Another object of the invention is to provide an excavating machine of the latter type wherein the digging unit comprises a bucket equipped, endless link arrangement of generally inverted triangular configuration in side elevation, providing for mounting of the digging unit closer to the respective end of the machine chassis as compared to heretofore known arrangements, such as for instance rotary wheel type digging units, or the conventional ladder type digging units.

Another object of the invention is to provide an excavating machine having a novel arrangement and associated operation of excavating bucket.

A further object of the invention is to provide a novel construction of excavating bucket for use on the digging line of a mobile excavating machine.

A still further object of the invention is to provide a novel construction of boom and its attachment mechanism to a mobile excavating machine, which boom construction has a wider range of movement as compared to heretofore known boom constructions, for permitting the use of a greater height of digging unit therewith, thereby increasing the maximum depth of excavation possible with the machine, and providing for pivoting of the boom and associated digging unit through an arc of movement of considerable magnitude, resulting in better balancing characteristics for the machine during roading operations, and for locating the digging unit well above ground level in the inoperative position of the boom and digging unit.

Briefly, the foregoing objects are accomplished in accordance with the invention by the provision of a bucket equipped, endless link, polygonal shaped, in side elevation, digging unit, and more particularly a digging unit having a more or less inverted triangular configuration in side elevation. There is also provided an articulated bucket arrangement, which bucket arrangement is adapted to unload while on a generally horizontal run of the digging unit. Moreover, there is provided in one embodiment of the machine a novel attachment mechanism of the boom to the excavating machine proper, which not only provides for the conventional vertical movement of the boom, but also provides for the aforementioned unique range of pivotal movement of the boom and associated digging unit. In another embodiment of such boom arrangement, there is disclosed a boom construction which is particularly adapted for mounting the polygonal shaped digging unit of the invention thereon.

Other features and advantages of the invention will be apparent from the following description taken in conjunction with the accompanying drawings wherein:

FIG. 3 is a rear end elevational view of the boom and associated truck structure for supporting the bucket line of the digging unit thereon, and is taken generally along the plane of line 3—3 of FIG. 2, looking in the direction of the arrows; the bucket line chain and associated buckets have been eliminated from the FIG. 3 showing in the interests of clarity;

FIG. 4 is a fragmentary, partially broken, bottom plan view of the digging run of bucket line chain and its coaction with the idler wheels of the lower truck support structure, and is taken generally along the plane of line 4—4 of FIG. 2 looking in the direction of the arrows;

FIG. 5 is a generally perspective, enlarged view of one of the bucket arrangements per se of the invention;

FIG. 6 is a generally perspective, exploded view of the bucket arrangement of FIG. 5;

FIG. 7 is a fragmentary sectional view taken generally along line 7—7 of FIG. 5 looking in the direction of the arrows;

FIGS. 8 to 14 show generally diagrammatically the relationship of the bucket parts traveling over the digging wheel drive shaft drum, and illustrating the positional relationships of the two bucket sections of one of the buckets as such bucket opens and closes;

FIG. 15 is an end elevational, partially broken view of the drive shaft and toothed drum arrangement for driving the digging unit;

FIG. 16 is a partial side elevational view of the FIG. 15 mechanism taken generally along line 16—16 of FIG. 15, looking in the direction of the arrows;

FIG. 19 is an enlarged, side elevational view of a modified arrangement of digging unit, utilizing a different chain link arrangement for mounting the articulated buckets of the invention;

FIG. 20 is an enlarged side elevational view of one of the chain links of the digging unit of FIG. 19;

FIG 21 is a top plan view of the chain link of FIG. 20;

FIG. 22 is a sectional view taken generally along the plane of line 22—22 of FIG. 20 looking in the direction of the arrows;

Figure 1:
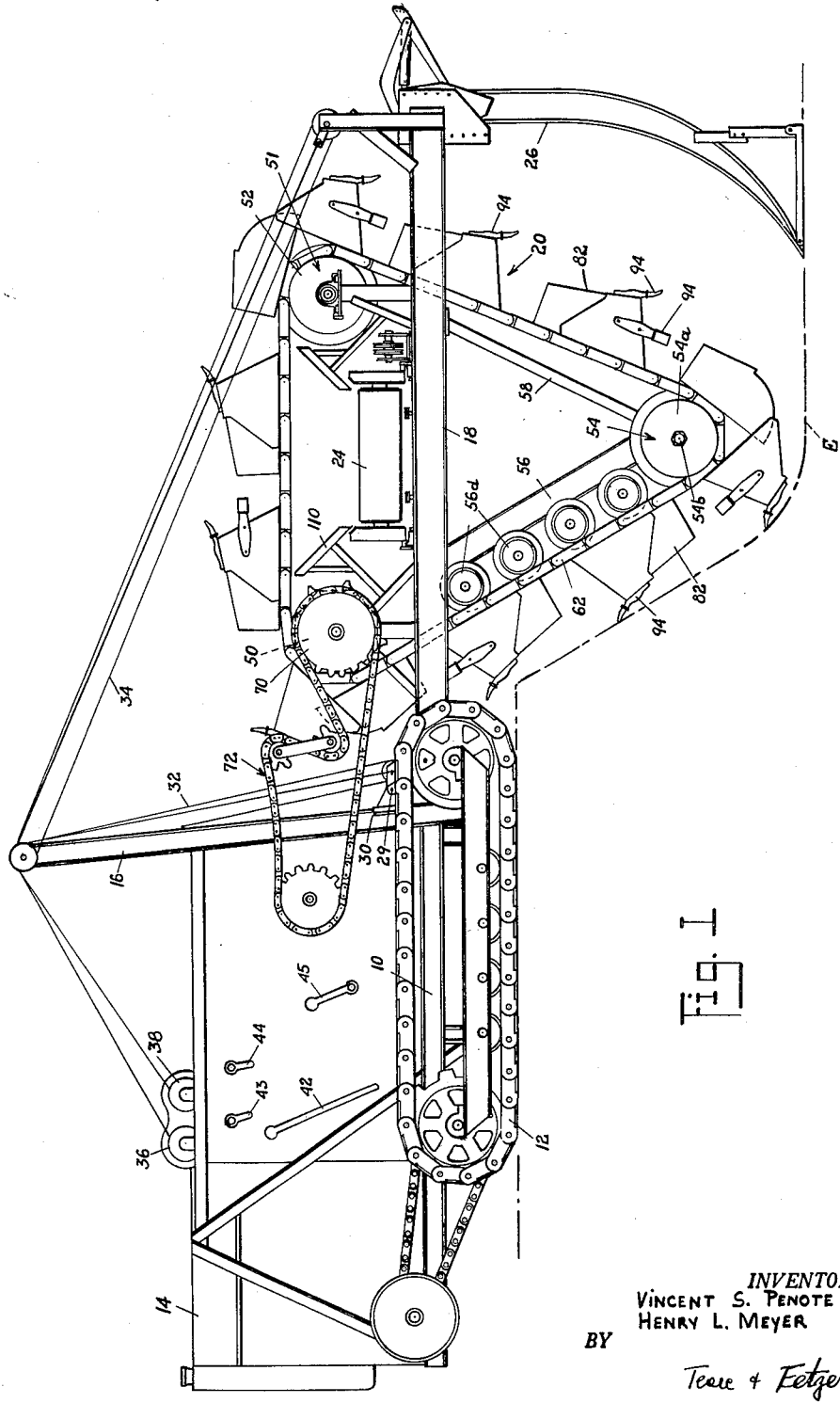
FIG. 1 is a side elevational view of an excavating machine in accordance with the instant invention, with the boom and associated digging unit having been lowered to a predetermined digging position.

FIG. 23 is an enlarged, fragmentary, side elevational view of a novel carriage mechanism for attachment of the boom to the excavating machine proper, for prowill be understood that such terminalogy is for identification purposes only, and that both bucket sections are adapted to receive excavated material or spoil therein during excavating operations. Front section 82a has a generally trapezoidal shape in side elevation and comprises side walls 84 and a transversely extending top or outer wall 86. The front edges of side and top walls 84, 86 are preferably beveled outwardly, as at 88 (FIG. 7) to provide sharpened cutting edges for the respective bucket. Each side wall may have a depending apertured lug 90 thereon, which is adapted to receive a pin or the like therethrough as at 91a (FIG. 2), to attach the front bucket section to the first link 91 of an underlying series of links of the bucket line. In the embodiment illustrated, each bucket overlies or encompasses at least three links in each of the chain stretches 60, 60a, and actually extends for approximately three and one-half links. Disposed rearwardly of lug 90 there is preferably provided a tang 92 on each side of the bucket, which is adapted to be received in the opening 80 in the respective chain link, to resist outward deformation of the bucket sides during excavating operations. The tangs are so disposed on the side walls so as to be out of interfering relation with the teeth 76 of the drive drum 50 during movement of the bucket line around the drum, and as will be hereinafter further discussed. Rooter teeth 94 of conventional type and preferably including removable cutting tips, are mounted on the top and sometimes on the sides of the front bucket section 82a and project forwardly therefrom.

Figure 2:
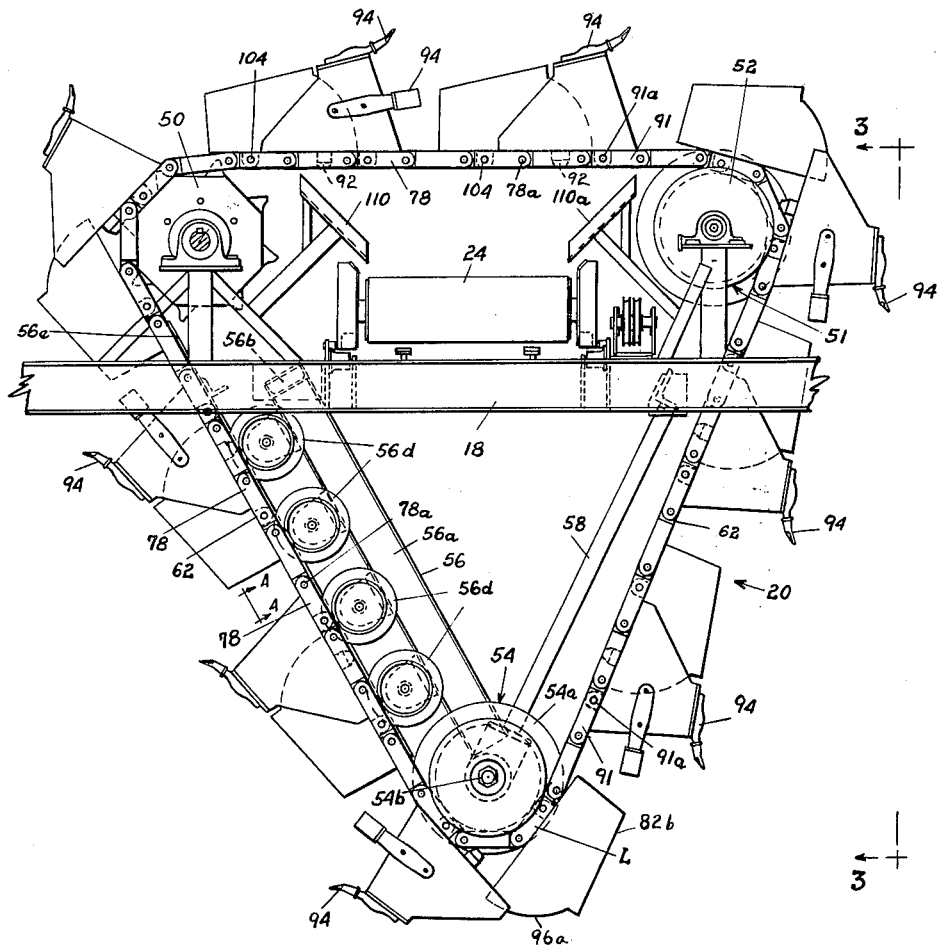
FIG. 2 is an enlarged, side elevational view of the boom and digging unit of the machine illustrated in FIG. 1.
Figure 17:
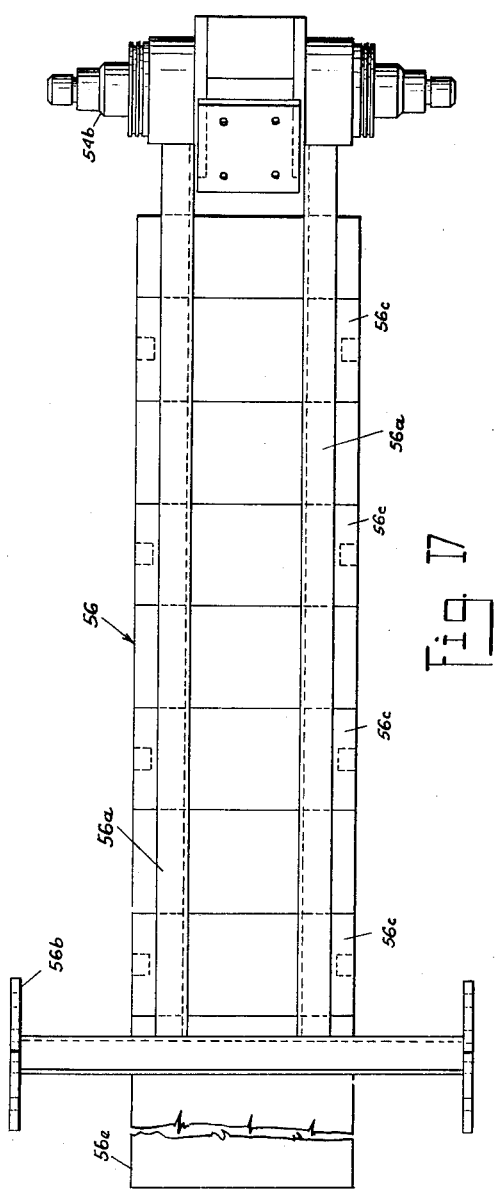
FIG. 17 is an enlarged top plan view of the forward lower truck element of the framework which supports the digging unit on the boom, and provides bearing support for the digging run of the bucket line chain arrangement during its upward digging movement.
Figure 18:
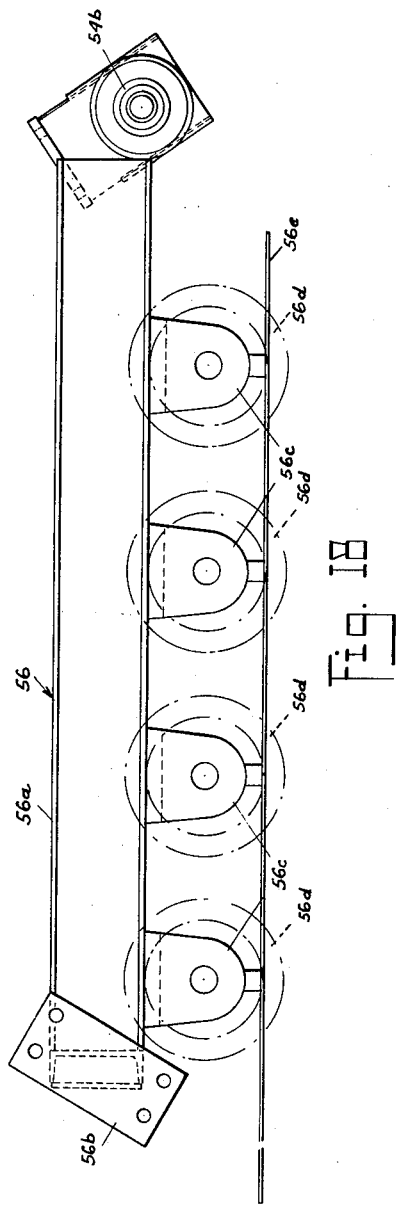
FIG. 18 is a side elevational view of the FIG. 17 element, with the idler wheels of the truck element being shown in phantom lines.
Figure 27:
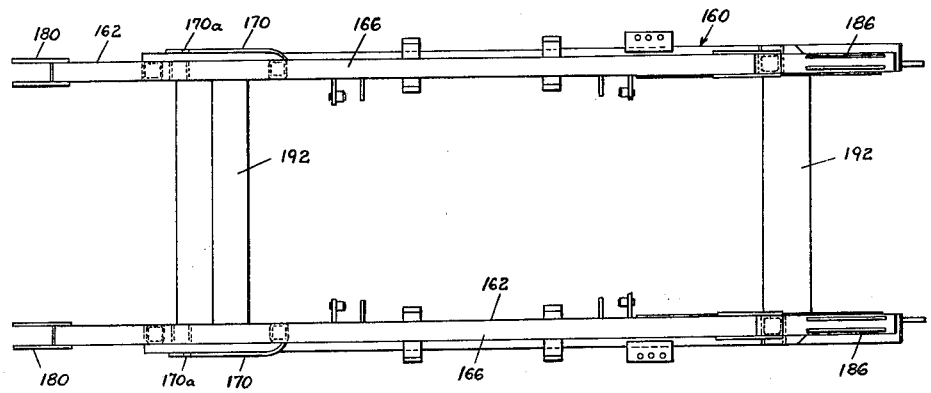
Figures 28, 29:
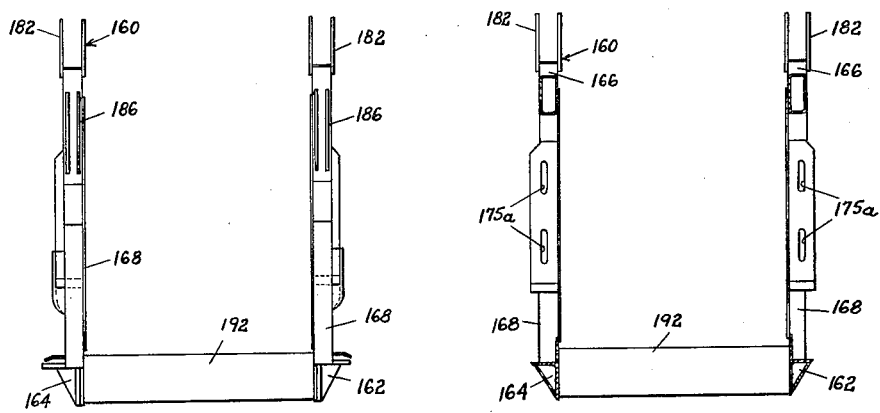

The rear bucket section 82b comprises side walls 96 which are preferably forwardly curved as at 96a at their forward ends, and a transversely extending top or outer wall 98, the forward extremity 98a of which is disposed rearwardly of the forward extremities of the side walls 96. Section 82b may also be provided with a preferably detachable back wall 99 interlockingly held to the side walls in a snap fastening coaction, and as by means of the lug 100 and coacting aperture 100a arrangement illustrated on the side walls and back wall respectively (FIG. 5). Back wall 99 may also include the downwardly and forwardly projecting flange portion 102, for aiding in retaining the dug material in the bucket up to the discharge station. Each side wall 96 may also include a projecting apertured lug 103 disposed adjacent the rearwardly end of the respective side wall, for attaching, as at 104 (FIG. 2) the rearward section 82b of the bucket to the associated links of the bucket line. As is illustrated in FIG. 5, the forward portions of side walls 96 of rear section 82b of a bucket are received in telescoped pivotally movable relation in the front bucket section 82a, in the assembled condition of the buckets on the bucket line. The front surface or edge of outer wall 98 of rear section 82b is preferably slightly spaced from the rearwardly facing edge of top or outer wall 86 of front section 82a in the assembled non-pivoted condition of the bucket on the chain stretches 60, 60a (FIG. 2). As can be seen in FIG. 2, there is preferably always overlap between the side walls of the bucket sections.

Referring now to FIGS. 8 to 14 there is illustrated the movement of one of the buckets as it passes around the drive drum 50 on its way to the discharge station represented in part by conveyor 24. The latter mentioned bucket, referred to by letter B, in FIG. 8 is shown as just commencing to move around the drive drum 50 in its still closed condition. In FIG. 9 the front section 82a of the bucket has moved or pivoted with respect to the rear section 82b of the bucket, to generally open the top of the bucket as at 106. However, the dug material or spoil in the bucket is still retained therein by the side and outer walls 84, 86 of front section 82a and the side and outer walls 96, 98 of the bucket rear section 82b. During movement of the bucket about drum 50, the underlying surfaces 74 of the drum take over from the aforementioned retainer plate 56e of the lower truck structure 54, to keep the dug material from falling out from the underside of the bucket arrangement. During movement of the front bucket section 82a around the drive drum it will be seen that the tangs 92 on the side walls thereof are withdrawn out of the openings 80 in the associated chain links. In FIG. 10, bucket section 82a has moved further to the top of the bucket line, to further pivot with respect to the rear section 82b, with the latter just commencing to move around the axis of shaft 66 with the drum 50. In FIG. 11, the bucket front section 82a commences its horizontal run while the rear section 82b pivots with respect to the front section toward closed condition. As can be seen in FIG. 11, the forward portion 96a of the rear section 82b leads the links L supporting such bucket rear section, and the latter reaches up as it rotates over the shaft 66, preventing dug material in the bucket from falling toward the front end of the machine. In FIG. 12, the front section 82a has moved past the drive drum and therefore the dug material commences to unload from the front section onto inclined chute 110, which as can be seen in FIG. 2 extends between the drum and the conveyor. Chute 110a is also provided extending between rear truck structure 51 and the conveyor. Chute structure 110, 110a may be supported on the boom out of interfering relation with the conveyor.

In FIG. 12 the bucket rear section 82b has moved toward the top of the drum and toward closed position of the respective bucket. In FIG. 13 the front section 82a commences moving across the conveyor on the horizontal run of the bucket line and the rear section 82b moves away from the drum and toward completely closed condition, so far as the outer or top section of the bucket is concerned. During this closing movement of the bucket rear section 82b, the latter actually slaps the underlying links of the chain in a shock producing motion when it pivots to closed bucket condition, which jarring of the chain and attached bucket sections effectively loosens the dug material in the bucket and causes it to discharge onto chute section 110. Thus, the instant arrangement provides for the discharge of the dug material in the buckets usually without the need for auxiliary bucket cleaning devices. It will be understood, however, that auxiliary bucket cleaning devices could be utilized with semi open-back buckets, the latter arrangement being known in the art, if the machine was operating in extremely wet or sticky soils, or merely semi open back buckets could be utilized, which conventionally decreases the resistance to soil discharge from an associated bucket. In FIG. 14 the bucket assembly is completely closed at it moves with the horizontal run of bucket line chain, and fully discharges its load onto the conveyor. In this connection the aforementioned depending portion 102 on the back wall of the bucket aids in shoving the dug material from the chute 110 onto the conveyor, since it extends down intermediate the bucket mounting links of the bucket chain.

In accordance with the instant invention, the outer extremity of the rooter teeth on the outer wall 86 of the front section 82a of each bucket are preferably disposed generally co-planar with a vertical plane or line S—S passing through the center of the chain link to which the front section 82a of the bucket is attached. This relationship can be best seen in FIG. 9 of the drawings. The reason for this cutting tip position is to aid in preventing undercutting of the trench as the buckets move around the lower truck wheels 54a, for if such rooter teeth are disposed materially forwardly of such a plane or line S—S, considerable undercutting in the vicinity of the lower truck wheels 54a would occur. The present arrangement provides a smooth cutting action for the excavating unit resulting in a smooth contoured excavation in the soil as illustrated by dot-dash line E in FIG. 1: It has been found that if the tip is within an inch of the desired line S—S, there is no undesirable undercutting.

In connection with the movement of the buckets around the wheels of the lower truck section, the aforementioned relationship of the forward portion 96a of the rear section 82b of the respective bucket leading the links L supporting such rear section (FIG. 2), likewise causes the rear section to reach out further from the chain as it rotates about the lower truck wheels 54a, allowing it to pick up any loose material at this point. However, the proportions are such that this reaching out does not exceed the path cut by the rooter teeth.

The crumbing shoe 26 extending downwardly to the bottom of the trench will support the rear of the boom 18 when trenching with the rear cable system 34 slackened, similarly to conventional practice when utilizing a rotary wheel type machine. However, this arrangement provides for easier control of the grade of the trench than is available with conventional ladder type machines which are not generally able to be equipped with a crumbing shoe to help support the digging unit.

Referring now to FIG. 19, there is disclosed a modified arrangement of digging unit which embodies lower truck support member 120 modified in that it does not comprise any idler wheels as in the first described embodiment of the invention, but merely supports a retainer plate 122 in forwardly facing position, for retaining spoil in the buckets during upward movement of the latter. The support element 120 is preferably disposed in a transverse plane oriented at 10° to the vertical as aforediscussed. Moreover, side walls 124 are provided in attached relation to retainer plate 122, to define a guiding trough 123 between which the upwardly moving stretches of bucket line chain are received in sliding guiding relation, with the chain links 126 engaging the retainer plate in sliding bearing relation. As can be seen, the flanged wheels 128 of lower truck structure 54 are of relatively greater diameter as compared to the diameter of drive drum 50 and the wheels 52 of upper rear truck structure 51.

Referring now to FIGS. 20 through 22, each chain link 126 comprises a pair of laterally spaced arms 130 having at their leading ends an upwardly projecting portion 130a, and attached at their trailing ends to a centrally disposed apertured tail section 132. The arms 130 are provided with axially aligned openings 134 for pivotally attaching each link to the tail section 132 of the preceding link. Portions 130a of the arms may also be provided with openings 136, for readily attaching the links to respectively bucket sections utilizing any suitable attaching means, as for instance pins, weld material or the like. In accordance with the instance invention, each arm 130 at its trailing end is provided with a rearwardly facing shoulder 140 projecting outwardly from the underlying trailing edge of the arm. Shoulders 140 are adapted for engagement with the leading edge 142 of the adjacent link to limit pivotal movement of one link with respect to the adjacent link in one rotary direction and thereby aids in preventing rearward buckling of the bucket line chain especially during its upward digging movement, and downward sagging or buckling of the bucket line chain during its horizontal unloading movement over the conveyor 124. Pivotal movement of the links with respect to one another in the opposite direction is not prevented or limited by shoulders 140, and therefore does not restrict the angling movement of the links with respect to one another as they pass around the drive drum 50 or the wheels of the upper and lower truck structures.

In the conventional ladder-type excavating machine, the buckets empty by dumping their load of spoil over their trailing edges as they rotate around the drive shaft of the digging unit. The bucket design for such machines has always been limited to a shape that could be cleaned as it rotated. Therefore, the bowl of the bucket has conventionally been an arc of a circle defined by the leading edge of the bucket as it passes around the aforementioned shaft. To maintain a reasonable bucket length, the bucket of the convention ladder-type machine is therefore necessarily relatively shallow. Also for a given pitch length of the bucket line chains, and a given number of teeth in the drive sprocket of the drive arrangement, the arc of the bucket bowl is constant even with a change in the bucket width. Thus for wider or greater width buckets, the latter become progressively flatter than a narrower bucket, and must be made heavier and stronger to support the greater flat width. The bucket arrangement of the instant application does not have these limitations, since the bucket unloads while on a horizontal run and can be cleaned while over the conveyor. Wider buckets could be made deeper and an arch shape of the bucket could be maintained with a change in width, without necessitating a change in bucket length, chain pitch or drive sprocket diameter, with the instant arrangement of digging unit. The importance of this feature is exemplified when it is realized that in most trenching operations, rocks and stones are encountered and the rate of forward progress of the machine is based on the ability of the buckets to carry the rocks out of the trench. With the usual ladder buckets, a large bucket cannot handle a larger round rock than a smaller bucket. With the present bucket arrangement, bucket width and height may be kept in proportion so that as the bucket size increases, larger rocks can be handled with a resulting increase in forward progress of the machine.

Because of the above limitations on bucket design, the usual ladder machine bucket has a low capacity. Because of the method of dumping in conventional ladder-type machines, the buckets must be spaced far enough apart to permit dumping between succeeding buckets. Thus for a given optimum rooter tip speed, the ladder machine has smaller buckets and fewer buckets per minute than the conventional rotary wheel machine of the same capacity. Therefore, the usual ladder-type machine digs at a much slower rate than the comparable rotary wheel type trencher. The instant arrangement of bucket has a large capacity because it is not limited to a shallow arc design, and the buckets may be spaced as close together as on a conventional rotary wheel type excavator because the buckets dump between the supporting bucket line chains when in an inverted horizontal run of the bucket line and do not risk dumping into the following bucket.

Referring now to FIGS. 23, 24 and 25, there is illustrated a novel boom supporting carriage arrangement for increasing the range of pivotal movement of the boom and associated digging unit with respect to the machine chassis, thereby providing for the use of a greater height of digging unit and resultant greater depth of excavation, and providing for improved balancing characteristics of the machine when the digging unit is moved to inoperative position, and especially during roading operations.

Carriage mechanism 150 comprises a frame 152 including generally upright elements 152a and crosswise elements 152b, with such frame being adapted to be received intermediate the uprights of the more or less conventional mast structure 16 of the excavating machine. Rollers or wheels 154 are rotatably mounted on frame 152, with such roller elements being adapted to engage in anti-friction rolling coaction with the front and rear flanges 156 (FIG. 25) of mast structure 16, thereby providing for facile vertical movement of the boom and associated digging unit with respect to the mast structure. Secured to frame 152 adjacent its lateral extremities are rearwardly projecting arms 158, which in turn are adapted to be pivotally connected as at 160 to the boom proper structure 18. In accordance with the invention, the connection of the cable and pulley system 32, which controls the vertical movement of the front end of the boom, is disposed considerably forwardly of the pivot points 160 of the boom to the carriage mechanism 150, thereby considerably increasing the effective moment arm of the force able to be applied by cable system 32 to the boom during digging operations, to thereby provide for forcing or "crowding" of the digging unit into the ground, and effectively resisting the rearwardly directed forces that tend to pivot the digging unit rearwardly out of engagement with the earth being dug.

Referring now to FIGS. 26 through 30, there is illustrated a boom structure 160, which is particularly adapted for mounting the aforediscussed digging unit of the invention thereon. Such boom structure comprises preferably fabricated side members 162 (FIGS. 26 and 27), each of which includes a bottom element 164 and a top element 166 connected by generally upstanding structure 168. An ear 170 is provided for pivotally attaching thereto, as 170a, the rearward ends of the aforementioned arms 158 of carriage mechanism 150. An opening 172 is provided adjacent the front end of the boom structure for receiving therethrough in mounted relation the drive drum shaft 66, and an elongated opening 174 is provided adjacent the rearward end of the boom structure, for adjustably mounting wheels 52 of the rear upper truck mechanism 51 thereon (FIG. 30). Adjustable screw mechanism 178 is provided for facilitating such adjustment of wheels 52, with the latter being supported by bearings 175 and associated fastener means, which are adjustably mounted on upright structure 168, and as by means of elongated openings 175a (FIG. 29) in such structure 168. Flanges 180 are provided on the front end of the boom forwardly of pivot points 170a, for attachment of front cable and pulley system 32 therethrough, and rear flanges 182 are provided for attachment of the rear cable and pulley system 34. Ears or flanges 186 may pivotally mount the crumbing mechanism 188, which is further coupled to the boom, as by means of adjustable turnbuckle mechanism 190 (FIG. 30). Side members 162 of the boom structure are connected by cross members 192, thereby providing a generally rigid high strength unit for supporting the digging line and the discharge conveyor mechanism 24.

Referring now to FIG. 31, it will be seen that the boom structure of FIGS. 23 through 30 may be pivoted about pivot points 160 or 170a, by proper actuation of cable and pulley systems 32, 34, and through a range of angular movement of at least approximately 90°, to thereby position the boom and associated digging unit well above ground level, and wherein it is disposed in an inoperative position. This provides for the possible use of a considerably greater height of digging unit, thus enabling the excavating machine to dig a wider range of depths of excavation, as compared to heretofore known arrangements wherein it was not possible to pivot the boom through such a range of pivotal movement. It will also be seen that with such a range of pivotal movement, the excavating machine is in a more balanced condition when the boom and associated digging unit are in an inoperative raised position, due to movement of the center of gravity of the machine forwardly, thereby considerably improving the roading characteristics of the machine.

From the foregoing discussion and accompanying drawings it will be seen that the present invention provides an excavating machine comprising a bucket equipped endless link polygonal shaped, in side elevation, digging unit together with a novel articulated bucket arrangement, providing for greatly increased capacity of the digging unit as compared to conventional ladder-type digging machines, and providing for a balanced excavating machine of reduced overall length as compared to the conventional rotary wheel and ladder types of digging machines. Moreover, the invention provides an excavating machine having a novel arrangement of boom which facilitates the forcing or crowding of the digging unit supported by the boom into digging contact with the earth, and wherein the range of pivotal movement of the boom is greatly increased, providing for the use of an increased height digging unit and resultant increase of depth excavation, together with better balancing characteristics for the machine during roading operations.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

We claim:

1. In a mobile trenching machine including a generally horizontally extending boom, means depending from said boom, first rotatable means mounted adjacent the lower end of said depending means, second rotatable means mounted on said boom forwardly of said first rotatable means, third rotatable means mounted on said boom in rearwardly spaced relation to said second rotatable means, transversely spaced strands of endless link chain strung about said rotatable means, buckets secured to said chain about the exterior periphery of said chain and projecting outwardly from the links of the chain to bridge said strands, each of said buckets comprising a forward section and a coacting rearward section, each of said sections comprising side walls and a bridging transverse wall, said transverse walls of each bucket being positioned outwardly from said strands and defining the depth of the respective bucket, with the latter being open intermediate said strands for discharge therebetween of material from the bucket, the side walls of each section being coupled to respective links of the chain, the forward ends of said side walls of said rearward section being disposed in overlapping non-connected relation with the side walls of said forward section, said sections pivoting with respect to one another during movement of the respective bucket about said rotatable means to cause separation of the respective transverse walls.

2. In a trenching machine in accordance with claim 1 wherein at least one of said sections includes depending tang means adapted to be received in the interstices of the associated chain for rigidifying the side walls of said sections against transverse deformation.

3. In a trenching machine in accordance with claim 1 wherein the side walls of said rear section includes means for attaching the rear section to the chain links and wherein the last mentioned side walls project forwardly from the last mentioned means in overlapping engageable relation with the underlying chain to provide abutment means adapted for slapping engagement with said chain during movement of said buckets about said one rotatable means.

4. In a trenching machine in accordance with claim 1 including rooter tooth members mounted on the forward edge of the forward section of each of said buckets, the outer ends of said tooth members being close to a normal transverse plane through the center of the front chain links mounting the respective bucket on said chain.

5. In a mobile trenching machine including a generally horizontally extending boom and an endless movable digging unit mounted on said boom, said digging unit including support structure depending from said boom, first wheel means rotatably mounted adjacent the lower end of said support structure, a polygonal shaped drum rotatably mounted on said boom forwardly of said first wheel means, means operatively connected to said drum for driving the latter, said drum including drive teeth extending outwardly therefrom, second wheel means rotatably mounted on said boom in rearwardly spaced relation to said drum, a pair of transversely spaced digging line chains formed of apertured links pivotally connected together and strung about said first and second wheel means and about said drum, said drive teeth on said drum being received in the apertures in the links of said chain for driving the latter upon rotation of said drum, a series of buckets mounted on said digging line chains in outwardly projecting relation thereto and bridging the latter, each of said buckets comprising a front section and a rear section respectively connected to corresponding links of said chain whereby said bucket sections are pivotally movable with respect to one another upon relative pivotal movement of the corresponding links of said chain, each of said bucket sections comprising side walls projecting outwardly from said chain and a transverse wall bridging said side walls in outwardly spaced relation to said chain, the side walls of each rear section extending into overlapping relation with the side walls of the respective front section and projecting forwardly of the connections of said rear section to the chain, said forwardly projecting portions of said rear section's side walls providing means on said bucket rear section for slapping said digging line chains upon movement of the respective bucket about said drum.

6. In a mobile trenching machine in accordance with claim 5 wherein one of said bucket sections include means thereon adapted for holding coaction with said chain, for resisting outward deformation of the sidewalls of the respective bucket.

7. A bucket adapted for attachment to a digging line of an excavating machine, which includes a pair of transversely spaced endless chains, said bucket comprising a front section and a separate rear section, each of said sections comprising side walls and an outwardly disposed bridging top wall, means on the side walls of each of said sections for attaching the latter to the chains, said side walls of said rear section projecting forwardly of said means thereon, said side walls of said front section projecting rearwardly of said means thereon, said side walls being adapted for overlapping relation when said sections are attached to the respective links of the chain, for relative pivotal movement with respect to one another.

8. A bucket in accordance with claim 7 including means on said front section adapted to be received in openings in the links of the digging line chain for resisting outward deformation of the sides of the bucket.

9. A bucket in accordance with claim 7 wherein the bottom boundaries of said rear section's side walls extend linearly and horizontally from said means thereon and adapted for slapping engagement with the chain during operation of the latter.

10. A bucket in accordance with claim 7 wherein the front boundary edge portions of the bucket are beveled outwardly to provide sharpened cutting edges for the respective bucket.

11. In a mobile trenching machine including a digging unit comprising a pair of transversely spaced, endless, link chains, a series of articulated-like buckets mounted on said chains and bridging the latter, each bucket comprising a front section, and a rear section disposed in overlapping relation at its forward end with the rearward end of said front section, each of said sections comprising transversely spaced side walls projecting outwardly from the corresponding stretch of chain and an outwardly disposed transverse wall bridging said side walls, each bucket being open intermediate said chains, and means on said chain links for limiting relative pivotal movement between the links in one pivotal direction but permitting unrestricted pivotal movement between the links in the opposite pivotal direction.

12. In a mobile trenching machine including a support and mast structure mounted on the support adjacent the rearward end thereof, carriage mechanism mounted on the mast structure for generally vertical movement with respect to the mast structure, a boom pivotally mounted on said carriage mechanism for pivotal movement in a generally vertical plane, an endless digging unit movably mounted on said boom, said boom being adapted to be disposed in a generally horizontal position extending rearwardly from said support during digging operations, first means coacting between the forward portion of said boom and said mast structure and second means coacting between the rearward portion of said boom and said mast structure for moving said boom and coupled carriage in said generally vertical plane, said boom extending forwardly of the pivotal connection of said carriage mechanism to said boom, and said first means being coupled to said boom forwardly of said pivotal connection, said boom being rotatable about pivotal connection from said generally horizontal position to a generally upstanding position upon predetermined actuation of said first and second means.

13. A mobile trenching machine in accordance with claim 12 wherein said mast structure comprises laterally spaced elements having lengthwise extending recesses on the inner side surfaces thereof defining trackways running for substantially the full height of the respective element, said carriage mechanism comprising a frame disposed intermediate said elements, wheels rotatably mounted on the side extremities of said frame and being received in said trackways for anti-friction rolling coaction therewith, and laterally spaced arms extending rearwardly from said frame and being pivotally connected to said boom adjacent the rearward ends of said arms.

14. A boom adapted for mounting thereon an endless digging unit of a mobile excavating machine, said boom comprising a generally elongated frame, means on the frame for pivotally connecting said frame to the excavating machine structure for pivotal movement of the frame in a generally vertical plane, said frame being adapted to extend in a generally horizontally oriented position during digging operations by the machine, and means on the forward and on the rearward portions of said frame adapted for coupling to power actuated means for moving said frame in said vertical plane, said forward means being disposed forwardly of the first mentioned means, said frame being adapted to be pivoted from said horizontal position to a generally upright position and vice versa.

15. A boom adapted for mounting thereon an endless digging unit of a mobile excavating machine, said boom comprising a generally elongated frame including laterally spaced side members and cross elements connecting said side members, means on said side members adapted to movably mount the digging unit thereon intermediate said side members, means on opposite sides of said frame disposed exteriorly of said side members for pivotally connecting said frame to an associated carriage mechanism of the excavating machine for pivotal movement of the frame in a generally vertical plane, said frame being adapted to extend in a generally horizontally oriented position during digging operations by the machine, and means on the forward and on the rearward portions of each of said side members adapted for coupling to power actuated means for moving said frame in said vertical plane, said last mentioned means on each of said members being in laterally aligned relation with the corresponding means on the other of said members and being disposed inwardly of the first mentioned means on the respective side member, said forward means on each side member being disposed forwardly of the first mentioned means on the respective side member, said frame being adapted to be pivoted from said horizontal position to a generally upright position and vice versa.

16. A boom adapted for mounting thereon an endless digging unit of a mobile excavating machine, means on said boom adjacent the forward end thereof for pivotally coupling said boom to the excavating machine for pivotal movement of said boom in a generally vertical plane, and means on the forward portion and on the rearward portion of said boom adapted for coupling to cable systems of the excavating machine for moving said boom in said vertical plane, said forward means being offset forwardly of the first mentioned means, said boom being adapted to be pivoted from a generally horizontally oriented position to a generally upright position and vice versa, through an arc of movement of at least 90 degrees.

17. A bucket adapted for attachment to a digging line of an excavating machine, which digging line includes a pair of transversely spaced endless chains, said bucket comprising a front section and a separate rear section, said sections being adapted for attachment to respective links of the chains for relative pivotal movement with respect to one another, said bucket extending for at least a series of three links of each of said chains and wherein said front section comprises a front boundary which slopes rearwardly with respect to the respective bucket, and rooter teeth mounted on said bucket adjacent said front boundary and projecting forwardly therefrom, said slope being of predetermined amount and said rooter teeth being so positioned with respect to said front boundary that the leading ends of said rooter teeth will be substantially disposed in a transverse vertical plane passing through the approximate center of the forwardmost of said series of links of each of the chains when the bucket is mounted on the chains.

References Cited in the file of this patent

UNITED STATES PATENTS

| | | |
|---|---|---|
| 488,460 | Tench | Dec. 20, 1892 |
| 740,499 | White | Oct. 6, 1903 |
| 794,624 | Hoadley | July 11, 1905 |
| 879,231 | Wrabek | Feb. 18, 1908 |
| 890,791 | Parsons | June 16, 1908 |
| 1,043,113 | Krupp | Nov. 5, 1912 |
| 1,194,375 | French | Aug. 15, 1916 |
| 1,623,957 | Barber | Apr. 12, 1927 |
| 1,717,476 | Topping | June 18, 1929 |
| 2,617,314 | Everett | Nov. 11, 1952 |
| 2,624,446 | Hovers | Jan. 6, 1953 |
| 2,648,145 | Askue | Aug. 11, 1953 |
| 2,935,801 | Stewart et al. | May 10, 1960 |

FOREIGN PATENTS

| | | |
|---|---|---|
| 922,755 | Germany | Jan. 24, 1955 |

Sept. 18, 1962 D. C. STEINWEDEL 3,054,200
ADJUSTABLE HEIGHT IRONING TABLES
Filed Feb. 1, 1960
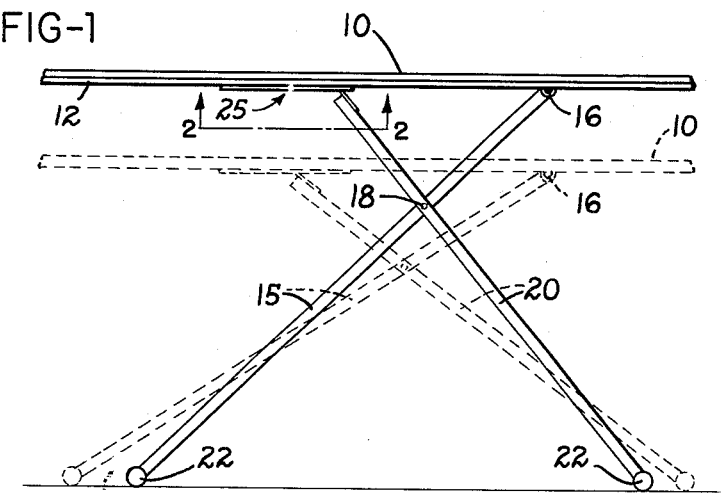
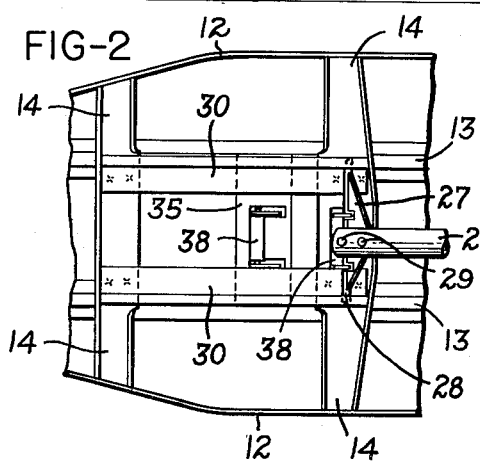
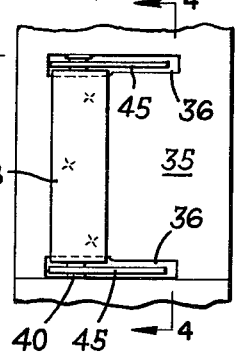
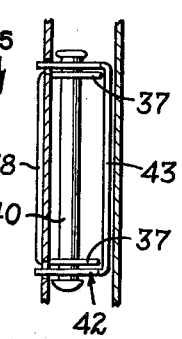
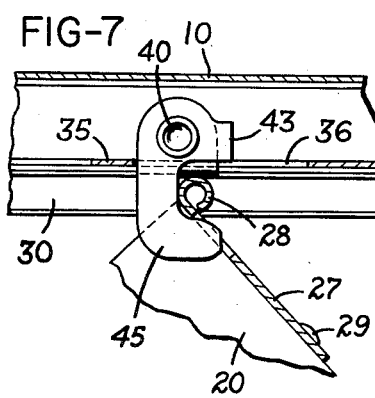
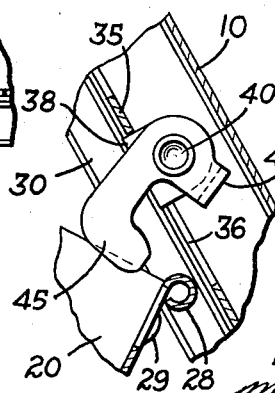
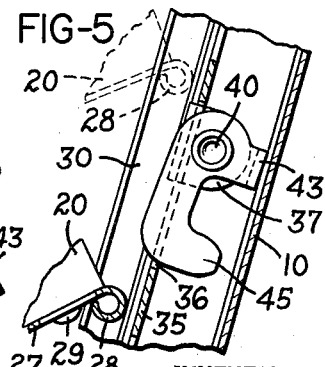
INVENTOR.
DELMAR C. STEINWEDEL
BY
Marechal, Biebel, French & Bugg
ATTORNEYS